March 3, 1953     G. R. ERICSON ET AL     2,630,294
LUBRICATED VALVE WITH LUBRICANT VENT Filed April 27, 1946     2 SHEETS—SHEET 1

INVENTORS.
GEORGE R. ERICSON
ROBERT A. SHIELDS
BY George R. Ericson
Robert A. Shields March 3, 1953 G. R. ERICSON ET AL 2,630,294
LUBRICATED VALVE WITH LUBRICANT VENT
Filed April 27, 1946 2 SHEETS—SHEET 2

INVENTORS.
GEORGE R. ERICSON
ROBERT A. SHIELDS
BY George R. Ericson
Robert A. Shields Patented Mar. 3, 1953

2,630,294

UNITED STATES PATENT OFFICE 2,630,294

LUBRICATED VALVE WITH LUBRICANT VENT

George R. Ericson, Kirkwood, Mo., and Robert A. Shields, Bloomsburg, Pa., assignors to American Car and Foundry Company, New York, N. Y., a corporation of New Jersey Application April 27, 1946, Serial No. 665,460

12 Claims. (Cl. 251—93)

This invention relates to valves and particularly to lubricated valves for high pressure lines.

It is an object of the invention to provide a valve in which the line pressure is balanced on the plug ends so that increase of pressure in the pipe line will not make the valve excessively hard to turn.

It is a further object of the invention to provide a valve of the above described character in which the lubricant pressure is limited so as to avoid bursting of the valve and in which the lubricant pressure is also limited in such a manner as to prevent the discharge of lubricant into the lading fluid.

It is a still further object of this invention to provide a lubricated valve in which only a predetermined pressure in excess of line pressure can be applied to the lubricant. The invention will be better understood upon reference to the following description and accompanying drawings in which Fig. 1 is a sectional elevation of a valve embodying the invention;

Figures 1, 2, 3:
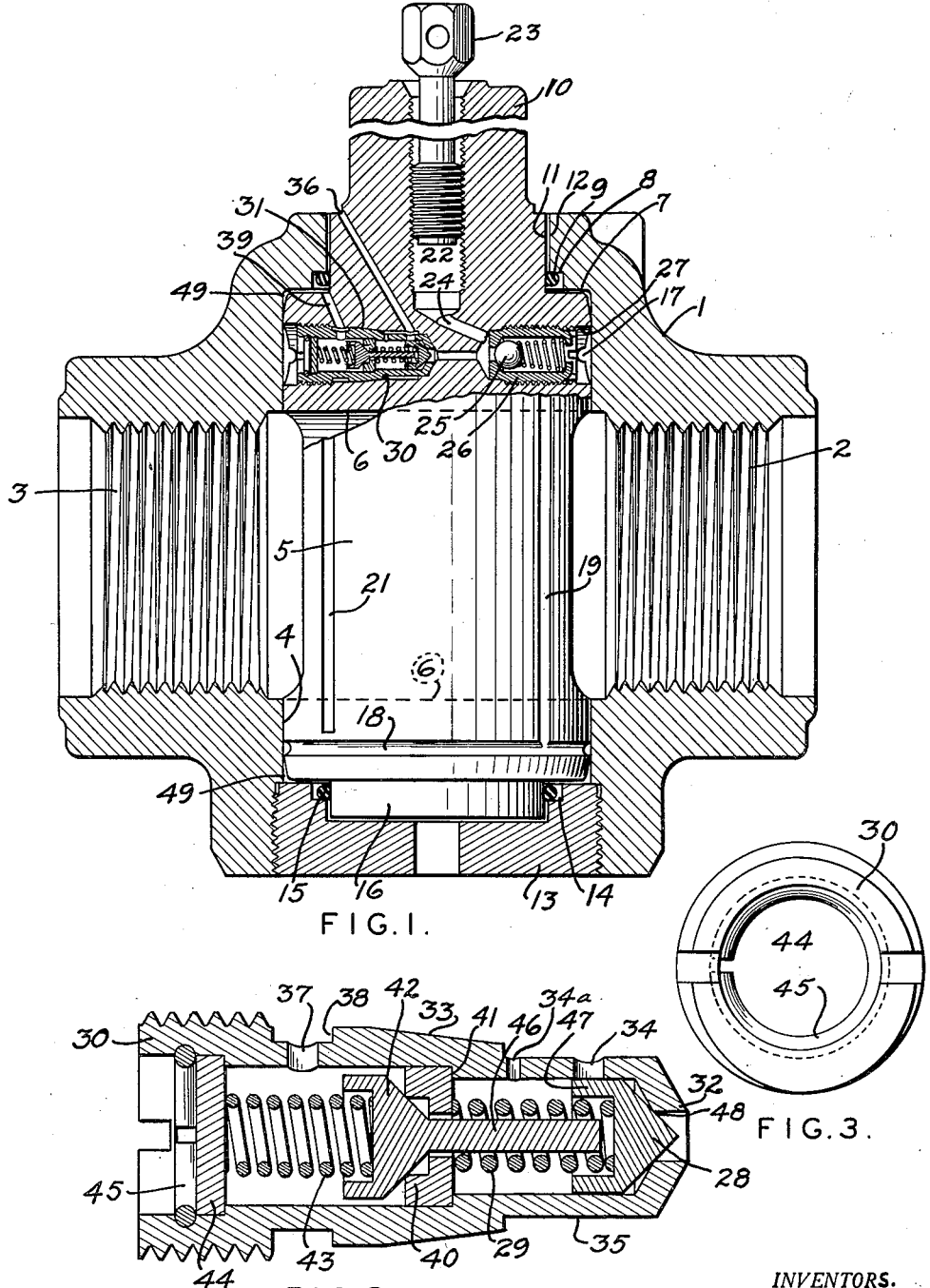
Fig. 2 is a detail view showing the relief valve, the same as in Fig. 1 except on a larger scale.
Fig. 3 is an end view of the valve shown in Fig. 2.
Figures 4, 5:
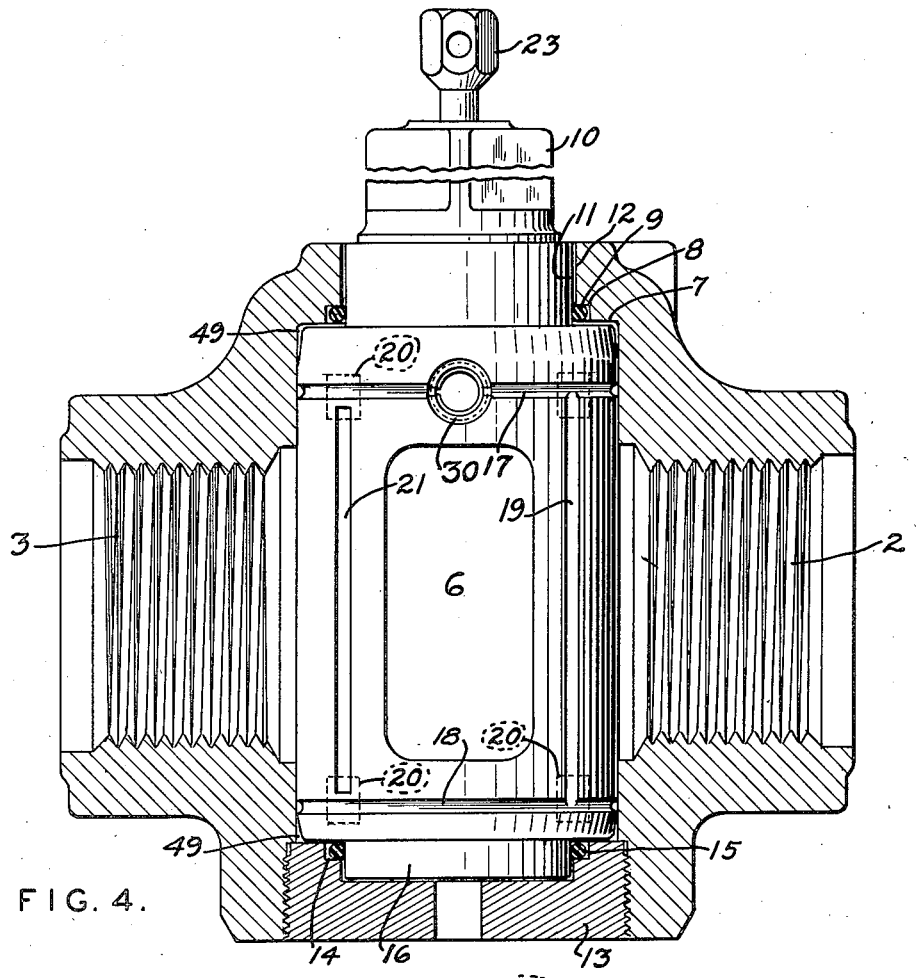
Fig. 4 is a longitudinal sectional view of the valve shown in Fig. 1 with the plug in a different operating position.
Fig. 5 is a developed view or diagram of the groove and port arrangement for lubricating the surface of the plug.

The valve body 1 is provided with screw threaded openings 2 and 3 by which it may be connected to a pipe line, and with a transverse bore 4 to receive the cylindrical plug 5 which is provided with a passage 6 serving to connect the openings 2 and 3 when the valve is open. The bore 4 is provided adjacent one end with a pair of stepped overhanging shoulders 7 and 8, the former overlapping and normally spaced from the upper end of the plug 5 and the latter being adapted to receive the resilient sealing ring 9. The valve plug 5 has a stem or wrench portion 10 connected to the main body of the plug by an enlarged cylindrical portion 11 which is closely engaged by the sealing ring 9. As shown in the drawing, there is a slight clearance between the cylindrical portion 11 and the corresponding bore 12 in the head end of the valve body and this clearance is sealed by the resilient ring 9. The lower end of the plug is held in position by means of the perforated closure plug 13 which is provided with a recess 14 adapted to receive a resilient sealing ring 15. This resilient sealing ring closely engages a suitable cylindrical extension 16 formed on the plug and having a cylindrical surface spaced slightly from the surfaces of the closure plug recess 14. The lubrication system for the valve surface is provided by means of upper and lower annular circumferential grooves 17 and 18 located adjacent the top and bottom ends of the plug and which are connected at all times by the pair of vertical grooves 19. These circumferential grooves 17 and 18 are additionally connected when the valve is in either open or closed positions by means of the dwarf ports 20 in the valve body 1 being in register with the short grooves 21. The valve is so arranged that the plug can only be turned a quarter revolution and the oppositely disposed grooves 19 can never be exposed to the wash of the pipe line fluid and when the short grooves 21 are exposed to the fluid they are cut off from the remainder of the lubricant system.

The lubricant for the grooves is supplied from the reservoir or chamber 22 which may be formed in the stem or wrench portion of the plug and may be put under pressure by the ram or cap screw 23. The normal flow of lubricant under pressure from the reservoir is through the inclined passageway 24 past check valve 25 which is mounted in a cage 26 screwed into or otherwise fastened in bore 27 as shown in Figure 1. The check valve is normally held in closed position by a spring so that while lubricant can flow from the reservoir 22 past the check valve into the grooves 17, there can be no reverse flow of lubricant or pipe line fluid or matter back into the reservoir or out of the valve in case the screw 23 has been removed to insert lubricant in the reservoir.

In order to limit the pressure of the lubricant which may be supplied to the groove 17 of the valve lubricating system, a relief valve 28 is provided held in closed position by spring 29 mounted in the relief valve body unit or member 30 screwed or otherwise inserted into a tapering opening or bore 31 formed in the plug. The relief valve body unit or member 30 is provided with sealing portions 32 and 33, the former to seat against the end of the opening or bore 31 as indicated, and the latter being tapered to insure a seal at the central portion of relief valve body unit or member 30. An outlet passageway 34 is provided between the sealing portions 32 and 33 and the tip of the relief valve unit is relieved as at 35 so that the bore 34 will communicate with the relief vent 36 extending through the shoulder of the valve plug regardless of the exact position of the member 30. The rear end of the relief valve unit 30 is provided with a port 37 connecting the inside of the unit with a relieved portion or groove 38 thus always providing communication between the line pressure inlet 39 in the plug and the interior of the unit.

The spring 29 previously referred to bears at one end on relief valve 28 and at the other end on collar 40 pressed into the unit until it bears upon limiting shoulder 41 thereby placing spring 29 under a predetermined compression. The predetermined compression of spring 29 will be so chosen as to hold relief valve 28 on its seat 48 against lubricant pressure high enough to fully charge the lubricant grooves, that is, high enough to overcome the pressure drop in the check valve assembly and in the groove system. A second valve 42 is carried within the unit and is forced onto a seat on collar 40 by means of a spring 43 bearing on the valve and on a disk 44 locked in the unit by snap ring 45. The valve 42 is provided with a stem 46 extending through collar 40 and acting as a guide for spring 29. This stem normally does not contact valve 28 but will come into contact therewith before skirt 47 of valve 28 uncovers port 34. In this manner the action of valve 28 is modified and valves 42 and 28 are insured a good bearing on their seats. Any pressure that might be trapped behind valve 28 is released through port 34a which also acts as a vent to atmosphere for material escaping around valve 42 when it is unseated by movement of valve 28.

The operation of the relief valve unit will be as follows, assuming the parts to be in their normal position as shown in Figs. 1 and 2: Insertion of lubricant into chamber 22 and its compression by ram 23 will cause the lubricant to flow through channel 24 past ball check 25 and into the valve lubricating system, including the grooves 17, 19, 18 and 21 until such grooves are fully charged. The lubricant will also bear against the exposed end of relief valve 28, which will be held on its seat until the lubricant system is fully charged by spring 29. As soon as the lubricant system has been fully charged the pressure will rise rapidly moving valve 28 off of its seat 48 and into contact with stem 46 of valve 42. Further application of lubricant pressure will further move valve 28 against the combined compression of springs 29 and 43 moving valve 42 off of its seat and eventually moving skirt 47 past port 34, thus permitting direct venting of lubricant out of passage 36. As soon as the operator sees lubricant escaping through opening 36 he will know that the valve has been fully lubricated. Movement of the valve 28 by lubricant pressure and the escape of lubricant through hole 46 will be quite rapid under conditions where no line pressure exists in the valve since as soon as valve 28 is unseated the area on which the lubricant can act will be immediately increased and the valve will snap to open position, venting lubricant through port 34. Under conditions where the valve is under line pressure, the movement of valve 42 by valve 28 will be resisted by the presence of line pressure in space 49 adjacent the ends of plug 5. It will be understood that when the valve is in use and line pressure is present, the valve 19 tends to shift laterally under the line pressure, and the fluid in the line readily passes to the area 49. During such line pressure conditions the loading of the lubricating system by operation of the screw plunger 23 will likewise cause a flow of lubricant to the area 49. To this extent both line pressure and lubricant pressure are at times available for discharge of the line fluid or the lubricant through passage 39 which may effect the seating of the valve 42. The port 34a of course permits the discharge of any fluid escaping through passage 39 into the chamber containing valve 42 and this fluid may be from the line or from the lubricating system. It is therefore to be understood that the area 49 may be considered a portion of the lubricating system. This line pressure can act through hole 39, groove 38 and passage 37 and will assist spring 43 in holding valve 42 onto its seat. This line pressure will also resist movement of the valve 42 off of its seat by valve 28. In cases where line pressure exists it will be seen that the snap action of valve 28 is slowed up due to the line pressure of valve 28 acting against valve 42. Under line pressure conditions the lubricant acting against valve 28 may force it off of its seat against the compression of spring 29, but when the valve 28 contacts stem 46 then its further movement is resisted by spring 43 as previously and also by the line pressure acting on valve 42. When, however, the lubricant pressure reaches a sufficiently high point, it will again cause valve 28 to further move unseating valve 42, and the instant valve 42 is unseated the line pressure acting thereon is vented out of 34a and valve 28 snaps to a fully open position venting lubricant out of port 34 and passage 36. As soon as sufficient lubricant has been vented the springs 29 and 43 will again seat their respective valves. From the preceding it will be seen that the area of valve 28 acted upon by lubricant varies in accordance with whether the valve is fully seated or moving toward open position. It will also be seen that the movement of this valve 28 is modified by means of the valve member 42 and in direct accordance with increase in line pressures, thus as the line pressure goes up so also does the pressure at which the lubricant will be vented through opening 36. In this manner full charging of the lubricant system is insured due to the modification of the movement of valve 28 in direct accordance with the line pressures.

While the valve has been described more or less in detail with particular reference to the drawings, it will be obvious to persons skilled in the art that slight modifications in arrangement and proportion of parts may be made without departing from the scope of the invention as defined by the following claims:

What is claimed is:

1. In a lubricated valve the combination of a valve body adapted to be connected to a pressure line and having a passageway therethrough for the flow of matter under pressure, a bore formed in said valve body and intersecting said passageway, a valve plug seated in said bore and rotatable to control the flow of matter through the body passageway, a lubricant system for supplying lubricant to the surface of said valve plug and being subject to line pressure, a lubricant chamber, reverse flow check means between said chamber and system, means for placing the lubricant under pressure to force the same through said check means into said system, relief means connected to said lubricant chamber and operable by lubricant pressure in said chamber to vent lubricant therefrom after said system has been fully charged, means including a port having a pressure responsive valve therein connecting said lubricant chamber with atmosphere, and means subject to line pressure opposing the operation of said pressure responsive valve during a portion of its movement.

2. In a lubricated valve the combination of a valve body adapted to be connected to a line and having a passageway therethrough for the flow of matter under pressure, a bore formed in said valve body and intersecting said passageway, a valve plug seated in said bore and rotatable to control the flow of matter through the body passageway, a lubricant system for supplying lubricant to the surface of said valve plug and being subject to line pressure, supply means including a lubricant pressure chamber for supplying lubricant under pressure to the lubricant system, relief means including a pressure responsive valve connected with said pressure chamber and connected to said system adjacent said supply means and operable by excess lubricant pressure to vent lubricant from said chamber, means modifying the operation of said relief means in accordance with line pressure changes existing within the valve body, consisting of a pressure responsive member movable against said pressure responsive valve and a port for supplying line pressure from a point in said lubricating system for operating said member.

3. In a lubricated valve the combination of a valve body adapted to be connected to a line and having a passageway therethrough for the flow of matter under pressure, a bore formed in said valve body and intersecting said passageway, a valve plug seated in said bore and rotatable to control the flow of matter through the body passageway, a lubricant system for supplying lubricant to the surface of said valve plug and being subject to line pressure, means for supplying lubricant under pressure to the lubricant system, a first valve means opening to vent excess lubricant supplied by said pressure supply means, and a second valve means connected to said system and modifying the opening of said first valve means substantially in direct accordance with line pressure changes in the valve body.

4. In a lubricated valve the combination of a valve body adapted to be connected to a line and having a passageway therethrough for the flow of matter under pressure, a bore formed in said valve body and intersecting said passageway, a valve plug seated in said bore and rotatable to control the flow of matter through the body passageway, a lubricant system for supplying lubricant to the surface of said valve plug and being subject to line pressure, means for supplying lubricant under pressure to the lubricant system, a first valve means opening to vent excess lubricant from said lubricant supply means, and a second valve means connected to said system and modifying the opening of said first valve means substantially in direct accordance with line pressure changes in the valve body, said valve means being so constructed and arranged as to require unseating of said second valve means prior to venting of excess lubricant.

5. In a lubricated valve the combination of a valve body adapted to be connected to a line and having a passageway therethrough for the flow of matter under pressure, a bore formed in said valve body and intersecting said passageway, a valve plug seated in said bore and rotatable to control the flow of matter through the body passageway, a lubricant system for supplying lubricant to the surface of said valve plug and being subject to line pressure, means for supplying lubricant under pressure to the lubricant system, a first valve means for venting excess lubricant from said lubricant supply means and subjected to lubricant pressure, and a second valve means subject to pressure of the line and modifying the action of said first valve means substantially in direct accordance with line pressure changes in the valve body, said valve means being so constructed and arranged as to require unseating of said first and second valve means in sequence prior to venting of excess lubricant.

6. An excess lubricant relief valve for lubricated valves adapted to be connected in a pressure line and comprising, a first valve adapted to be subjected to lubricant pressure, a second valve adapted to be subjected to pressure of the line, means to urge said valves onto their seats, means to vent to atmosphere matter escaping past said seats, and means whereby said second valve will be unseated by said first valve subsequent to the unseating of said first valve by lubricant under pressure.

7. An excess lubricant relief valve for lubricated valves adapted to be connected in a pressure line and comprising, a first valve adapted to be subjected to lubricant pressure, a second valve adapted to be subjected to pressure of the line, means to urge said valves onto their seats, means to vent to atmosphere matter escaping past said seats, and lost motion means between said valves whereby sequential unseating thereof is obtained.

8. In a lubricated valve the combination of a valve body adapted to be connected to a line and having a passageway therethrough for the flow of matter under pressure, a bore formed in said valve body and intersecting said passageway, a valve plug seated in said bore and rotatable to control the flow of matter through the body passageway, a lubricant chamber, a lubricant system for supplying lubricant from the chamber to the surface of said valve plug, means for supplying lubricant under pressure from the lubricant chamber to said lubricant system including lubricant pressure means and a connecting passageway between the chamber and system, reverse flow check means in said passageway between said lubricant chamber and lubricant system, and relief means connected with said lubricant chamber at the inlet side of said check valve and operable by lubricant pressure in the chamber to vent lubricant from said chamber when said check valve is closed due to pressure in said lubricant system.

9. In a lubricated valve the combination of a valve body adapted to be connected to a line and having a passageway therethrough for the flow of matter under pressure, a bore formed in said valve body and intersecting said passageway, a valve plug seated in said bore and rotatable to control the flow of matter through the body passageway, a lubricant system for supplying lubricant to the surface of said valve plug and subject to pressure of matter in the body passageway, a lubricant chamber, reverse flow check means between said lubricant chamber and lubricant system, means for placing the lubricant in the chamber under pressure to force the same through said reverse flow check means to said system, relief means including a passageway connecting said lubricant chamber with atmosphere, a normally seated spring loaded valve in said passageway, said spring loaded valve being operable to open position by excess lubricant pressure in said chamber to vent lubricant therethrough only after said lubricant system has been fully charged, and an additional port admitting line pressure to said relief valve and acting to hold said valve closed against the pressure of said lubricant in said lubricant chamber.

10. An excess lubricant relief means for lubricated valves adapted to be connected in a pressure line and comprising a first spring seated valve adapted to be subjected to and opened by lubricant pressure, a second spring seated valve arranged in series with the first valve and adapted to be subjected to and opened by said lubricant pressure, said second valve being further urged to seating position by line pressure, means to vent to atmosphere matter escaping past said seats, and means whereby said second valve will be unseated by the first valve subsequent to the unseating of the first valve by lubricant pressure.

11. In a lubricated valve adapted to be connected in a pressure line, the combination of a valve body, a valve plug in said body, lubricant passageways between said body and said plug, lubricant pressure means in the plug for supplying lubricant to the lubricant passageways, a reverse flow check valve positioned between the lubricant pressure means and said lubricant passageways, a relief valve operative to vent lubricant from said pressure supply means to atmosphere when said check valve is closed due to lubricant pressure in said lubricant passageways, said relief valve having a connection with the line pressure to normally seat the same, whereby said relief valve is limited in its opening movement by line pressure for regulating the discharge of lubricant from said pressure means.

12. In a lubricated valve the combination of a valve body adapted to be connected to a line and having a passageway therethrough for the flow of matter under pressure, a bore formed in said valve body and intersecting said passageway, a valve plug seated in said bore and rotatable to control the flow of matter through the body passageway, a lubricant system for supplying lubricant to the surface of said valve plug and being subject to line pressure, means for supplying lubricant under pressure to the lubricant system, a first valve means movable to vent excess lubricant from said lubricant supply means, and means resisting movement of said first valve means, said last named means including a second valve arranged in series with the first valve and normally moved toward closed position by a spring, said second valve including a stem positioned in the path of movement of said first valve, said second valve being acted upon by line pressure in the supply system to increase the resistance to movement of said first valve means upon increase in line pressure.

GEORGE R. ERICSON.
ROBERT A. SHIELDS.

REFERENCES CITED

The following references are of record in the file of this patent:

UNITED STATES PATENTS

| Number | Name | Date |
| --- | --- | --- |
| 2,038,889 | Clade | Apr. 28, 1936 |
| 2,389,670 | Kerr | Nov. 27, 1945 |
| 2,485,831 | Jacobsen | Oct. 25, 1949 |